Patented June 28, 1938

2,122,185

UNITED STATES PATENT OFFICE 2,122,185

METHOD OF WELDING LEAD AND LEAD ALLOYS

Albert A. Smith, Jr., Metuchen, N. J., assignor to American Smelting and Refining Company, New York, N. Y., a corporation of New Jersey No Drawing. Application March 20, 1937, Serial No. 132,093

3 Claims. (Cl. 113—112)

This invention relates to the art of uniting articles or surfaces of lead and lead alloys by burning or welding processes.

Among other features, the invention provides an improved burning rod and an operating procedure which, though applicable to the joining of lead and lead alloy surfaces generally, is of especial importance when used in conjunction with those alloys that are particularly difficult to unite.

In the manufacture of storage batteries, for example, it has been customary to unite the grids to the terminals by a burning or welding operation and when the grids are of antimonial lead, it is effected with little difficulty. With some of the improved alloys, however, considerable difficulty is experienced in uniting the grids and terminals although the alloys are otherwise far superior to antimonial lead.

Alkaline earth-lead alloys, with or without other alloying constituents, are examples of improved alloys that present a problem in integration caused, apparently, by the formation of oxidic products on the surfaces being joined thereby preventing a clean metal to metal contact.

It has now been found that surfaces or articles of such alloys can be readily and successfully united through the use of sodium acetate as a flux. In fact, tensile strength tests show that the weld produced when using sodium acetate is every bit as strong as the unwelded material.

The flux may be applied in various manners, a successful one being to coat a burning rod of desired composition with a water solution of sodium acetate and subsequently drying same thereby providing a fairly uniform coating of sodium acetate on the rod. As sodium acetate melts at a temperature just below the melting point of lead, the flux flows readily as the burning rod melts. The flux may be applied in other forms, e. g., as powder, and in manners other than that above described.

The advantages accompanying the use of the invention are well illustrated from the results obtained in welding a lead alloy containing 0.32% tin, 0.043% calcium and 0.029% magnesium. Using the sodium acetate flux, the specimens always broke outside of the welded joint when tested for tensile strength, the specimens showing a reduction of area of 100% at the fracture and the metal being pulled down to a knife edge at the break. Welds effected on the same alloy without the sodium acetate flux always broke at the joint and examination disclosed only a partial union of the surfaces.

While certain specific disclosures have been made for purposes of illustration, the invention is not limited thereto. Thus, it may be used to unite surfaces of other lead alloys such as binary alloys of lead and calcium, alkali metal-lead alloys, etc. In general, it may be said to be applicable to lead and the various lead alloys as are used for the production of battery grids, cable sheathing and other lead products.

What is claimed is:

1. The process for uniting lead or lead alloy surfaces which comprises welding same in the presence of a sodium acetate flux.

2. The process of uniting surfaces of lead and lead alloys suitable for battery grids or cable sheaths, which comprises applying sodium acetate thereto as flux during welding.

3. The steps in the manufacture of storage batteries, which comprise producing the electrode grids from a suitable lead-alkaline earth metal alloy, and welding the grids to the battery terminal posts in the presence of a flux consisting of sodium acetate.

ALBERT A. SMITH, JR.